United States Patent [19]

Berni

[11] Patent Number: 5,109,362
[45] Date of Patent: Apr. 28, 1992

[54] REMOTE SEISMIC SENSING

[75] Inventor: Albert J. Berni, Houston, Tex.

[73] Assignee: Shell Oil Company, Houston, Tex.

[21] Appl. No.: 739,780

[22] Filed: Jul. 31, 1991

Related U.S. Application Data

[63] Continuation of Ser. No. 600,897, Oct. 22, 1990, abandoned.

[51] Int. Cl.$^5$ .......................... G01V 1/24; G01B 9/02; G01P 3/36
[52] U.S. Cl. ....................................... 367/14; 356/349
[58] Field of Search ............. 356/345, 349, 351, 28.5; 73/657; 367/7, 14

[56] References Cited

U.S. PATENT DOCUMENTS

| | | | |
|---|---|---|---|
| 3,409,369 | 4/1964 | Bickel | 88/1 |
| 3,604,804 | 9/1971 | Penney et al. | 356/28 |
| 4,277,167 | 7/1981 | Eppel | 356/5 |
| 4,284,350 | 8/1981 | Coon et al. | 356/28.5 |
| 4,551,018 | 11/1985 | Mannava et al. | 356/28.5 |
| 4,583,095 | 4/1986 | Peterson | 343/5 NA |
| 4,818,100 | 4/1989 | Breen | 356/5 |
| 4,834,111 | 5/1989 | Khanna et al. | 128/774 |
| 4,843,597 | 6/1989 | Gjessing et al. | 367/15 |

FOREIGN PATENT DOCUMENTS 0194941  9/1986  European Pat. Off. ............. 356/349

OTHER PUBLICATIONS

"Laser Remote sensing, Fundamental applications" by R. M. Measures, John Wiley & Sons, New York, 1984, p. 203 (book not provided).
"Exploratory Research by General Research of Interest to EP Sectors Biweekly Newspaper", The Royal Shell Exploration & Production Lab., vol. 32, No. 17, Oct. 12, 1984, (translation attached hereto).
Sommargren, G. E., "Optical Heterodyne Profilometry", Applied Optics, vol 20, #4, Feb. 15, 1981.
Cookson et al., "Mechanical Vibration measurements using a fibre optic laser Doppler Probe", Optics & Laser Technology, Feb. 1978.

Primary Examiner—Ian J. Lobo

[57] ABSTRACT

Methods and apparatus are provided for remotely sensing motions of the earth from the Doppler shift of reflected electromagnetic waves. The apparatus is based on a heterodyne continuous wave or pulsed laser system. The airborne laser system described herein is intended to remotely sense seismic motion. Motion of the earth's surface, when coupled to a reflector, causes a continuously shifting frequency (Doppler) of the reflected sensing laser beam, the Doppler frequency being proportional to the particle velocity of the ground. The method uses electromagnetic waves reflected from reflectors, some of which are coupled to the earth's surface. Similarly, "inertial" reflective surfaces (i.e., vibrationally isolated from any earth motions) are also located at the surface of the earth and employed by the apparatus and methods of the present invention. Both an inertial reflector and an earth-coupled reflector are positioned at each location for which seismic signals are desired.

3 Claims, 5 Drawing Sheets

REMOTE SEISMIC SENSING

This is a continuation of application Ser. No. 07/600,897, filed Oct. 22, 1990 now abandoned.

BACKGROUND OF THE INVENTION

The present invention relates to exploration seismic surveying, and more particularly, relates to remotely detecting motions of the earth that are detected through the use of electromagnetic waves.

It is generally the objective of seismic exploration to generate seismic energy, make measurements of and record the amplitude of any reflected and refracted energy at selected locations and for selected times, and then by selectively processing the recorded seismic data, to deduce the geometry of the subsurface geologic boundaries as well as some of the properties of the materials of the earth through which the seismic energy has propagated and from which it has been reflected.

Conventional land seismic acquisition techniques involve the use of an appropriate source (dynamite, vibrator(s), airguns(s), etc.) to generate seismic energy and a set of receivers, spread out on the surface of the earth, to detect any seismic signals due to seismic energy interacting with subsurface geologic boundaries. These detected signals are recorded as a function of time and subsequent processing of these signals, i.e., seismic "traces" or seismic data, is designed to reconstruct an appropriate image of the geologic boundaries of the subsurface and to obtain information about the subsurface materials. In simplistic terms, this conventional acquisition process has a seismic wave, from a source of seismic energy, travelling down into the earth, reflecting from a particular geologic interface (i.e. a change or contrast in elastic constants, velocities, and/or densities), and returning to the surface, where the seismic wave may be detected by an appropriate receiver, or receivers.

Conventionally, the receiver employed to detect seismic signals on land is a geophone. A geophone is an electro-mechanical device that is coupled to the ground via an extension or "spike" that is physically inserted into the ground. This allows the geophone case to vibrate as a result of any earth motions, including seismic signals. Internal to the geophone case and vibrationally isolated from the case (typically by springs) is an "inertial" mass that does not vibrate with the earth. Thus, there is a small relative motion between the geophone case and its inertial mass due to any detected ground motions. This relative motion is converted to an electrical signal by having a coil of wires move through an electromagnetic field from a permanent magnet; the magnet may be the inertial mass with the coil attached to the geophone case, or vice versa. This electrical signal is the seismic signal that is recorded and later processed.

In general, seismic field layouts vary with the exploration objective sought to be detected. However, there is almost always a need to simultaneously record seismic motion at many ground positions spaced over a wide area. Conventional 2-D acquisition is usually limited to shot ("seismic energy source") locations and receiver locations with maximum spacings therebetween ("offsets") of about 10,000 meters (10,000 m) along a given survey line. A seismic line usually consists of multiple detector stations with each detector station made up of several detectors. The detectors are grouped together and connected so as to reject unwanted waves while enhancing the reception of desired seismic waves. The distance between stations is usually 25 to 50 m to allow for adequate spatial resolution of the subsurface geologic boundaries.

The signals from these arrays of detector stations are collected and recorded for each seismic shot (seismic energy source). A wavelet emitted for a seismic shot is usually a pulse of about 30 milliseconds (ms). Depending upon the depth of the layer of the subsurface from which they are reflected, received wavelets have lengths of 60-250 ms. The frequency spectrum of a received wavelet is typically limited at high frequencies, since the earth's absorption increases with frequency. The lower end of the frequency spectrum of a received wavelet is usually determined by detector sensitivity. Geophones have a natural vibration frequency at about 5-8 Hz but are damped to avoid any natural resonance at this frequency; this damping usually precludes acquiring seismic data below about 10 Hz. Thus, the normal operational seismic range is typically about 10-80 Hz. A typical geophone sensitivity is about 28 volts/(meter/sec).

The signal strength of the received wavelets measured with a geophone decreases with time after each shot until the signal reaches noise level, after which the wavelets cannot be identified anymore. The initial reflected signal level is typically a few hundred millivolts, while noise level is usually a few tens of microvolts (these voltages are rms values); the signal-to-noise ratio (SNR) runs from about 70 db (initial reflected signal) to 0 db (detection limit), with anything greater than about 30 db representing good signal quality.

Figure 1:
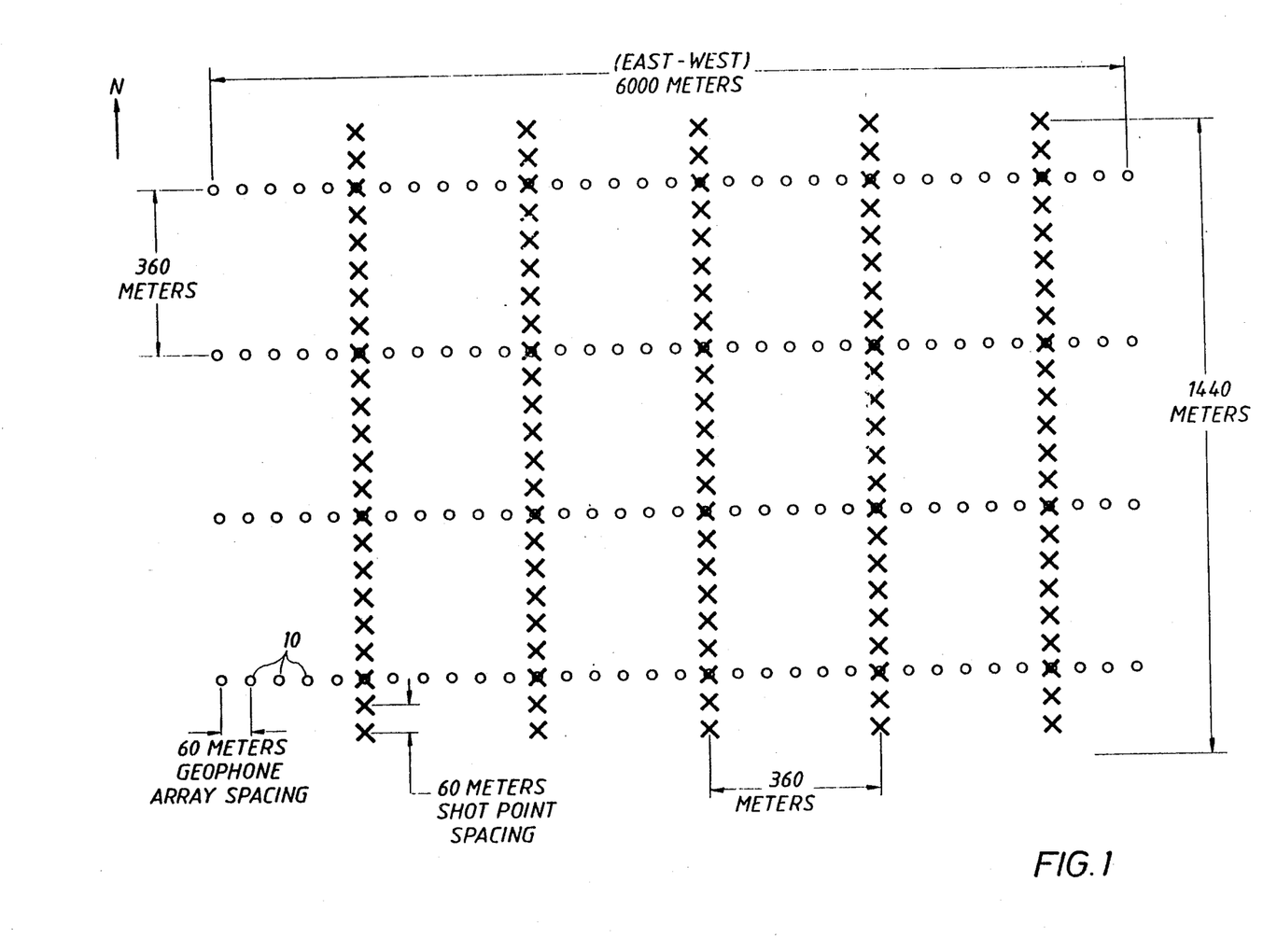
FIG. 1 depicts the general arrangement and layout of receivers and seismic sources for a conventional 3-D land seismic survey.

In a conventional hypothetical land 3-D survey, shown in FIG. 1, each E-W line spans 6000 m with 60 m spacing intervals between each station (or array center) location 10 along an E-W line. Each array station may comprise, for example, 10-12 geophones. Four parallel lines, offset by 360 m N-S, are used simultaneously in this hypothetical example. This requires 400 active recording channels. After acquiring seismic data for several days, the bottom two E-W lines are each leapfrogged 1440 m to the North and the process is repeated until the detector spread has progressed the desired distance, i.e. covered the area of interest.

Such conventional land seismic data acquisition is slow, expensive and labor intensive. In particular, the activities of installing and then later removing the receivers or geophones is slow and labor intensive. The rapid expansion of 3-D acquisition, where many more source locations and many more receiver locations are used, puts even greater emphasis on developing more cost effective methods for receiving seismic signals.

It would be desirable to have many more channels so that finer spatial sampling and longer offsets in the N-S direction could be obtained during the activation of one seismic source, which may be, for example dynamite, vibrators, or air guns. It would also be desirable to have a fast way to move the entire detector spread or portions thereof and thereby minimize survey time.

Remote sensing of seismic vibrations is one potential solution for reducing the cost and time for acquiring seismic data. Remote sensing could be performed from an airborne platform (see FIG. 5) at some height above the earth area sought to be seismically surveyed.

However, conditions on the surface of the earth for remotely detecting seismic vibrations are quite different from most other remote detection conditions. More particularly, the minimum particle velocities associated with the seismic vibration amplitudes to be measured are very small ($10^{-6}$ m/sec) and the natural reflectivity of the earth's surface is highly variable and is low in many cases. In addition to the desired seismic vibrations, the earth's surface also undergoes other types of vibrations. Further, the power of any radiation directed from an airborne platform to the ground must be limited in order to prevent eye damage to animals or people who look up at the radiation source. In addition, the height of the detecting platform is high to ensure adequate coverage of a large detection (survey) area. Finally, any detection scheme should also have a linear response over a wide range of seismic amplitudes.

U.S. Pat. No. 4,834,111 to Khanna et al discloses a heterodyne interferometer for measuring low vibration amplitudes of objects having low reflectivities; this heterodyne interferometer is principally for measuring inner or middle ear vibrations. Further, remote sensing vibration measurement equipment is commercially available. However, such equipment has a limited detection distance range (order of tens of meters) and use a very small target area (usually determined by a focused beam and having an approximate diameter of 50 to 100 micrometers). Such vibration measurement equipment is usually based upon laser Doppler interferometry.

U.S. Pat. No. 4,284,350 to Coon et al discloses a laser geophone. This reference employs a homodyne technique and as such is unable to distinguish an upward ground motion from a downward motion. Further, this reference employs no frequency shifting techniques and thus incurs much higher noise levels. The present invention is an improvement over the Coon, et al invention.

Rugged and transportable laser Doppler interferometer equipment have been developed for measuring wind velocities (wind shear) in front of aircraft and adjacent to airport runways. However, wind velocities are several orders of magnitude larger than seismic velocities (meters/sec versus $\mu$meters/sec). These wind measuring systems have detection distance ranges of up to hundreds of meters and also use focused beams.

However, such known equipment is not well suited for remote seismic sensing. The single, focused, small spot is very sensitive to intensity variations from beam interruption and deflection, as well as local variations in spot reflectivity because of small beam movements at large distances. These intensity variations may cause a loss of signal.

These and other limitations and disadvantages of the prior art are overcome by the present invention, however, and new, improved methods and apparatus are provided for acquiring seismic signals with remote detection techniques which allow for faster seismic surveys.

SUMMARY OF THE INVENTION

In a preferred embodiment of the present invention (FIG. 5), methods and apparatus are provided for remotely sensing seismic vibrations of the earth's surface. The methods of the present invention illuminate with electromagnetic radiation those portions of the earth having reflectors mounted thereon (or therein) where seismic signals are desired to be sensed and determine such seismic signals from detected electromagnetic radiation from said reflectors. More particularly, the methods of the present invention use a continuous wave (CW) or pulsed laser beam to illuminate a portion of the earth where reflectors have been located at selected positions on the earth to reflect the laser beam and determine seismic signals from the Doppler shift of the detected, reflected laser beam. The methods may also include employing time-of-flight measurements to obtain ground elevation data for those illuminated portions of the earth. The apparatus of the present invention is based on a laser Doppler interferometer using heterodyne or offset homodyne techniques to detect seismic signals.

The airborne laser system described herein is intended to remotely sense seismic motion. Motion of the earth's surface when coupled to a reflector causes a continuously shifting frequency (Doppler) of the reflected sensing laser beam. The Doppler frequency is proportional to the particle velocity of the ground. The method uses electromagnetic waves reflected from reflectors, some of which are coupled to the earth's surface. Similarly, "inertial" reflective surfaces (i.e., vibrationally isolated from any earth motions) are also located at the surface of the earth and employed by the apparatus and methods of the present invention. Both an inertial reflector and an earth-coupled reflector are positioned at each location for which seismic signals are desired.

It is an object of the present invention to provide methods and apparatus for remotely sensing seismic signals.

It is an object of the present invention to provide methods and apparatus for remotely sensing seismic signals using reflected electromagnetic waves.

It is an object of the present invention to provide methods and apparatus for performing land exploration seismic surveys.

These and other objects of the present invention will become apparent from the following detailed description, wherein reference is made to the Figures in the accompanying drawings.

BRIEF DESCRIPTION OF THE DRAWINGS

FIG. 4b is a plan view of the retroreflector of FIG. 4a.

DETAILED DESCRIPTION OF THE INVENTION

In a preferred embodiment of the present invention, methods and apparatus are provided for remotely sensing seismic vibrations at the earth's surface. The methods of the present invention use a continuous wave (CW) or pulsed laser beam to illuminate those portions of the earth where seismic signals are desired to be detected. The laser beam is reflected by appropriate reflectors positioned along the surface of the earth. The detected, reflected laser beam is Doppler shifted by any earth motions and the methods of the present invention determine this Doppler shift using various heterodyne interferometry techniques.

The preferred apparatus of the present invention is based on a laser Doppler interferometer employing heterodyne techniques to detect seismic signals. Preferably, the apparatus is an airborne system based on a laser Doppler interferometer that employs the methods of the present invention. The airborne system may be employed on any type of airplane, helicopter, balloon, or any other type of above-ground mobile platform. However, portions of the airborne system, such as, for example, but not limited to, the laser and its associated power supply and cooling system, may be located at the surface of the earth.

The term "seismic signal" is used herein (in either singular or plural form) to mean motions of the earth's surface induced by seismic waves, whether those seismic waves are created artificially or naturally. The term "seismic velocity" is used herein (in either singular or plural form) to mean the velocity of motions of the earth's surface (land or water) induced by seismic waves, whether those seismic waves are created artificially or naturally.

The airborne system of the present invention can remotely sense seismic ground motion and should yield large cost reductions for land data acquisition. With the apparatus and methods of the present invention, moving a seismic land detector group consisting of individual reflector units will be much easier than moving geophones having attached cables. In its simplest embodiment, such remote sensing is accomplished by illuminating with a laser beam at least those portions of the ground where seismic signals are sought to be detected and appropriate reflectors have been positioned. In general, any wave reflected from a moving object has a frequency shift caused by the Doppler effect; this shift in frequency is proportional to the velocity component of the moving object along the line of sight of the laser beam. Thus, any detected, reflected laser beam is Doppler shifted by any ground motion coupled to the reflector, i.e., the return signal's frequency shift is proportional to the particle velocity at the ground's surface. Both the sender and receiver may be large distances from the earth's surface, and may be at different spatial locations. Various heterodyne methods may be used to detect the Doppler frequency and to obtain a signal equivalent to that obtained from a geophone through frequency demodulation.

In summary, remote seismic data acquisition involves detection of the reflected waves (from appropriate reflectors positioned on the earth's surface) and their associated Doppler shifts followed by frequency demodulation to extract the seismic velocities represented by the Doppler shifts. Thus, any subsequent processing and interpretation of these signals should be similar to conventional processing and interpretation of geophone signals.

Figure 2:
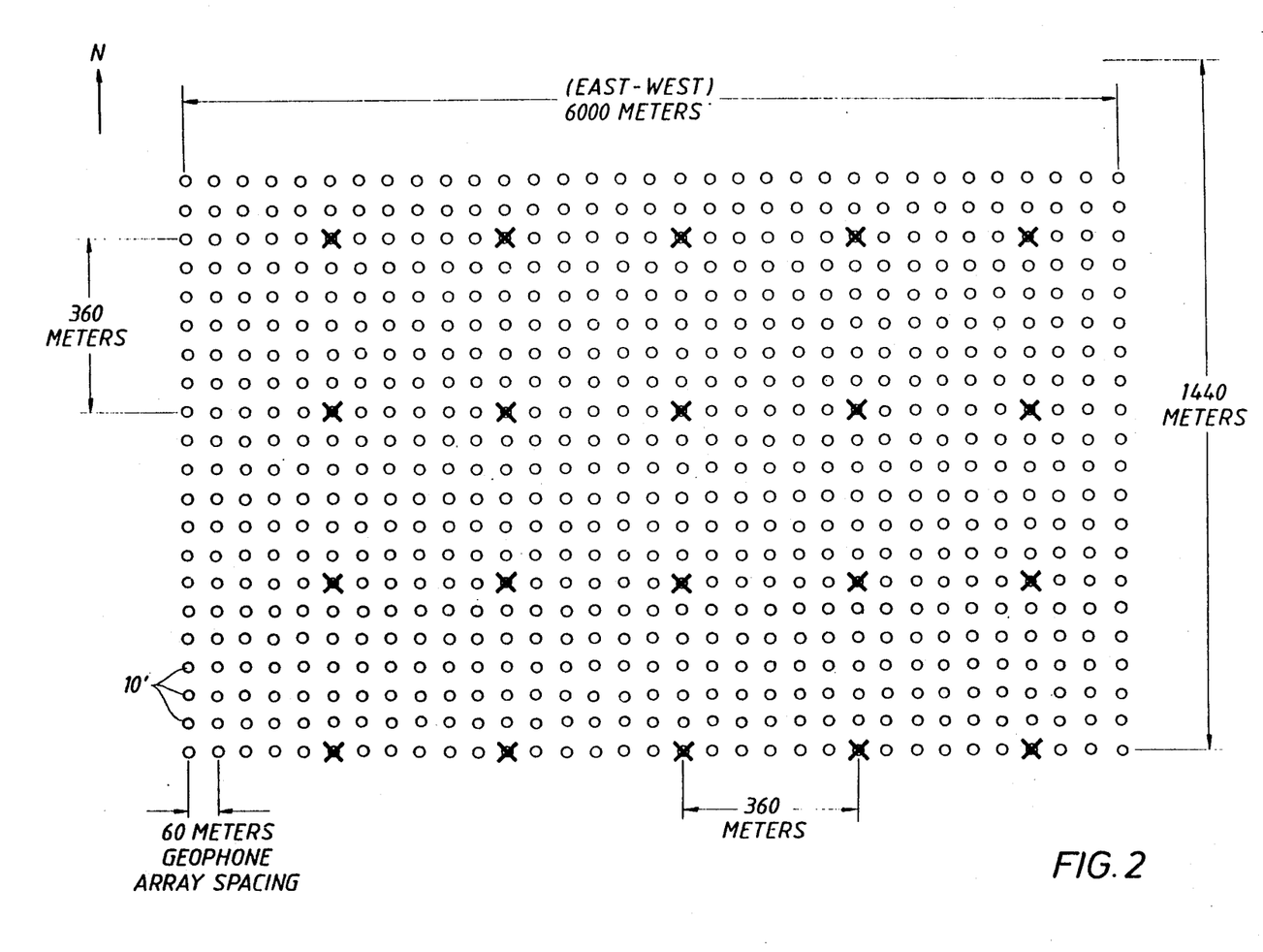
FIG. 2 shows the general layout of receivers and seismic sources used in the present invention.
Figure 5:
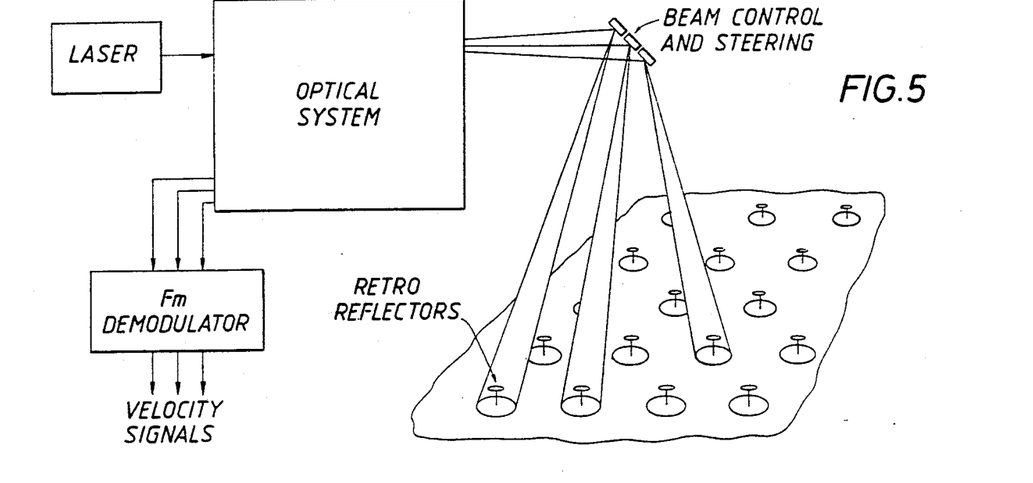
FIG. 5 depicts a simplified block diagram of an airborne laser platform of the present invention, showing multiple detection areas and utilizing the Doppler interferometer of FIG. 3.

The airborne laser system of the present invention such as shown in FIG. 5 and operating at an elevation of 1000 m or higher may sample the ground every 5 m and then sum the signals from 12 such locations together at every 60 m interval over a square area 1440 m on a side as shown in FIG. 2. Each summed signal 10' represents a recorded "channel" signal. The desire to obtain good vertical ground motion signals, even when projected onto the laser's line-of-sight path at the "edge" of the square dictate the maximum size of the data acquisition square for a particular height above the earth of the airborne system. The cosine of the angle from the vertical to the laser path is selected to be no less than 0.8 at the "edge" of the square to ensure good vertical ground motion signals; however, values of cosine other than 0.8 may be employed, and shapes other than a "square" of acquisition area may be employed in the methods and apparatus of the present invention. Such an interval (60 m) and square area (1440 m)$^2$ requires 576 channels for the laser system. Each recorded data channel 10' consists of the summation of the demodulated signals from 12 retroreflectors spaced at 5 m on the ground's surface. Such a laser system would be able to simultaneously perform the hypothetical 3-D survey of FIG. 2 described hereinbefore. The survey could also be performed faster and with a finer spatial sampling than a conventional geophone system.

The total area of a desired survey is divided up into smaller parts. Each part must then be illuminated over an area covering sufficient dimension to ensure illumination of the appropriate reflector. An area or spot of about 0.5 m in diameter should be sufficient. Alternatively, a larger or smaller area may be illuminated. A one-to-one relationship between spots and receivers is presently preferred; thus, a matrix of receivers is needed to simultaneously image all the detection spots. Alternatively, one beam and receiver may be used to quickly scan from reflector to reflector.

The airborne laser system described herein is intended to remotely sense seismic motion. Motion of the earth's surface when coupled to a reflector causes a continuously shifting frequency (Doppler) of the reflected sensing laser beam. The Doppler frequency is proportional to the particle velocity of the ground. The method uses electromagnetic waves reflected from reflectors (to be subsequently described), some of which are coupled to the earth's surface. Similarly, "inertial" reflective surfaces (i.e., vibrationally isolated from any earth motions) are also located at the surface of the earth and employed by the apparatus and methods of the present invention. Both an inertial reflector and an earth-coupled reflector are positioned at each location for which seismic signals are desired.

For electromagnetic radiation in and near the visible spectrum (including infrared), only intensity may be directly detected, since such radiation frequencies are too high for direct frequency detection. Frequency information (such as Doppler shifts) can only be extracted from intensity changes. Frequency differences between two beams from the same source can be transformed into intensity beats by heterodyne interferometric mixing of the two beams. The "beat" frequency equals the frequency difference between the two beams. Thus, Doppler shifts in and near the visible spectrum (including infrared) can be detected by heterodyne interferometric mixing. Further, effective heterodyne interferometric mixing requires that the beams to be mixed be almost parallel and almost completely overlapping at the "point" of mixing and that the beams have the same polarization.

Figure 3:
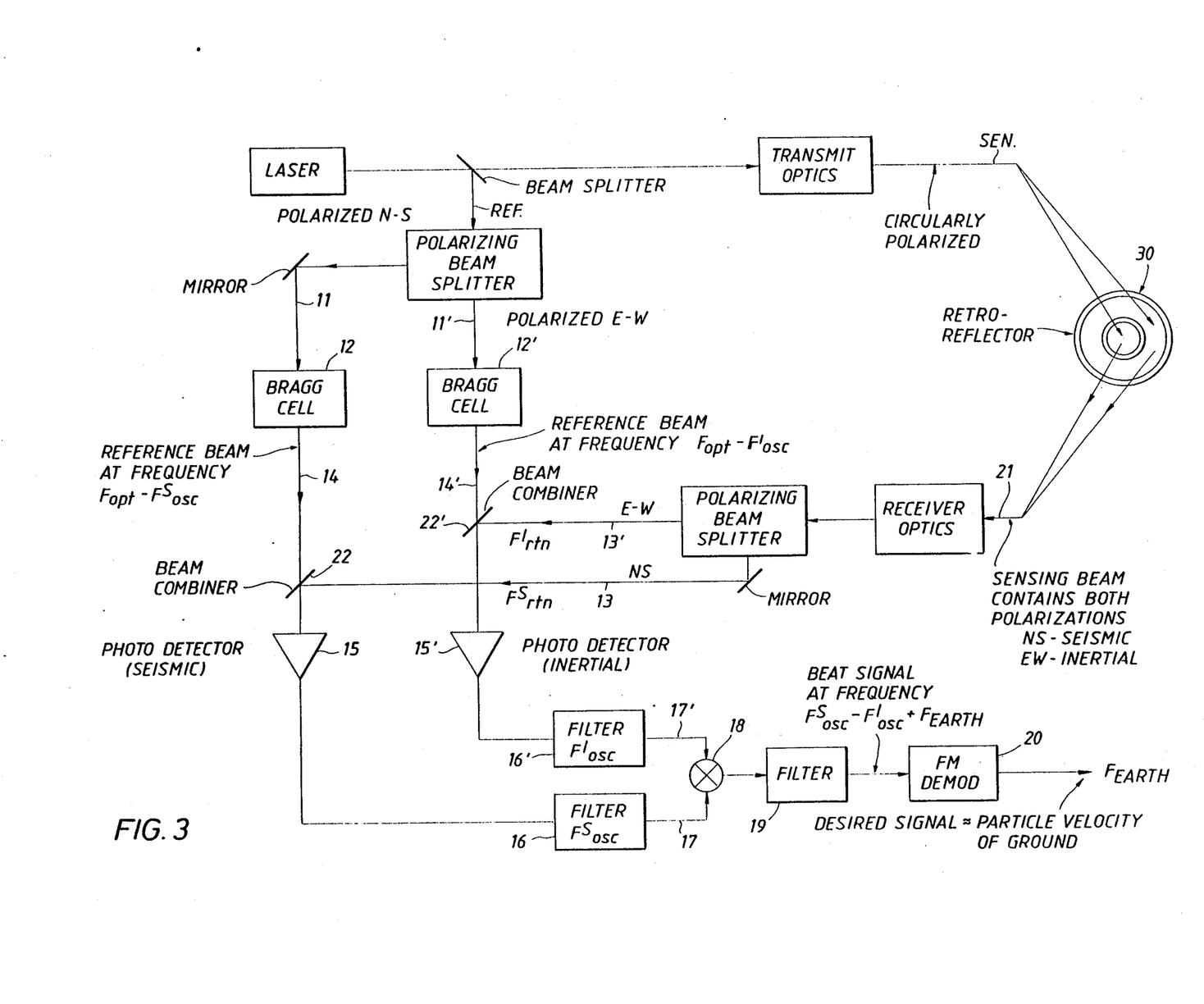
FIG. 3 depicts a simplified block diagram of a laser Doppler interferometer as employed by the present invention.
Figure 4A:
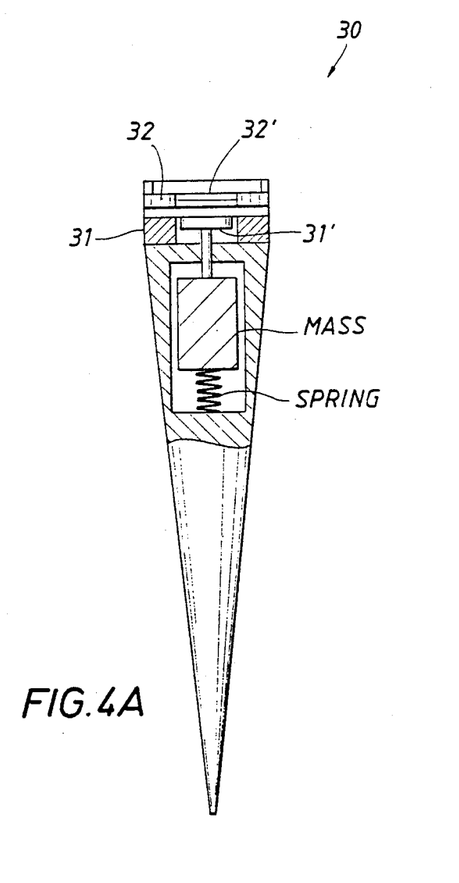
FIG. 4a is a cross section of a retroreflector suitable for use in the present invention.
Figure 4B:
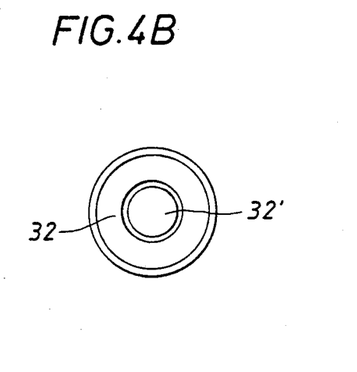
Figure 4C:
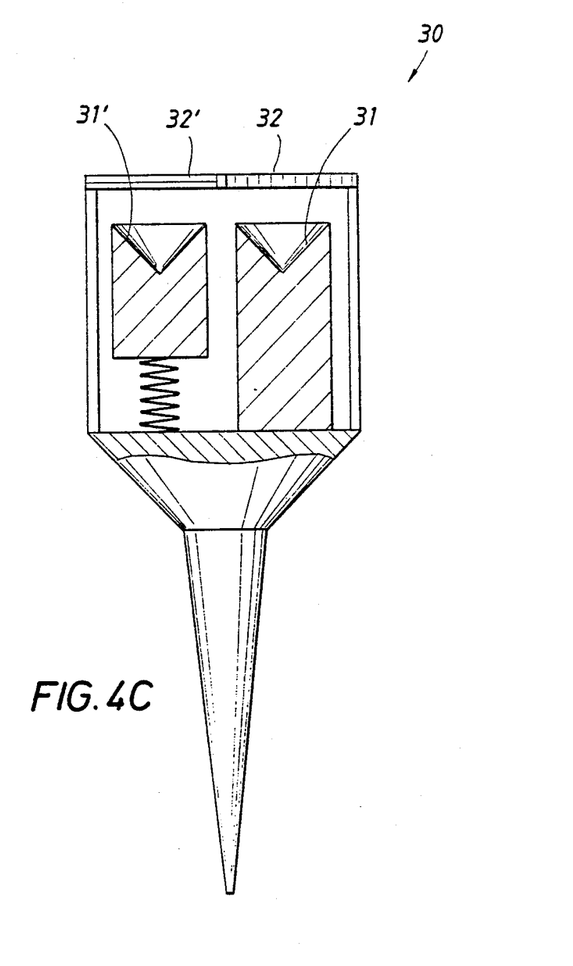
FIGS. 4c and 4d depict a preferred retroreflector configuration in cross section and plan view, respectively.
Figure 4D:
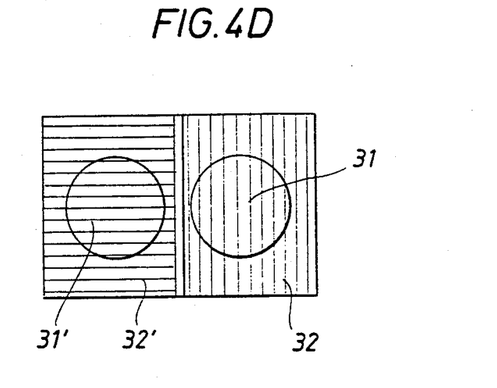

Referring now to FIGS. 3 and 4 for remote detection the laser beam is split into a sensing beam SEN (sent to and reflected by the earth, i.e. containing the Doppler shift) and a reference beam REF (which is dual polarized and each polarization given a frequency preshift larger than any expected Doppler shift). Mixing of the sensing (reflected) and reference beams from the laser, a process known as heterodyning (or interferometric mixing), generates an intermediate beat frequency signal, or "carrier", that is frequency modulated by the ground motion Doppler. The term "offset homodyne" is also used when the sensing and reference beams are both derived from the same laser. Further, two such sensing and reference beams may be employed by encoding the sensing beam at the reflector to contain two "signals"; one signal being the earth motion from an earth-coupled reflector 31 and the other signal being a "no-motion" signal from an inertial reflector 31'. The earth motion signal would employ one plane of polarization (via a polarizing filter 32 in front of the earth-coupled reflector) and the "no-motion" signal would employ a different (90° rotated) plane of polarization (via a polarizing filter 32' in front of the inertial reflection). This requires two reference beams REF having these same two planes of polarization. The resulting two SEN and REF dual polarized signals may then be combined (by polarization) to obtain a final signal representative of the Doppler shift.

As noted before, Doppler frequency shifts in electromagnetic waves in and near the visible light spectrum (including infrared) can only be detected by interferometric mixing of a sensing and reference beam. At the same time, relative frequency fluctuations between the two beams show up on the beat signal and may be misinterpreted as Doppler frequency shifts. However, using two signals derived from the same electromagnetic source allows for cancelling such fluctuations. In any event, relatively stable sources of electromagnetic radiation, such as lasers, are preferably used.

To obtain the seismic velocities, the interferometric mixing signal must be demodulated. However, in order to determine the sign of the seismic velocities, the interferometric signal should be centered around some offset frequency; this allows both up-Doppler and down-Doppler to be determined. To obtain such an offset, either one (or both) of the reference or sensing beams may be given a frequency shift prior to mixing. This may be accomplished by passing the beam (REF beam is used in this example) through an opto-acoustic cell, called a Bragg cell 12, 12'. This frequency pre-shift yields the desired offset frequency at 14 and 14'. In addition, two Bragg cells may be employed (not shown) in series along one beam (preferably the reference beam) to allow for varying the frequency preshift as desired.

FIG. 4 shows two possible configurations for the retroreflector. In these examples, polarizing lenses are used to separate the beam into mutually perpendicular polarized beams. There are other ways to accomplish this separation, e.g. by using a polarizing beam splitter cube, by using a Glan polarizing cube, or by using a Wollaston Prism.

A Bragg cell 12, 12' is a piece of glass sustaining a moving density grid caused by a travelling acoustic wave generated by an oscillator appropriately connected to the glass. This grid diffracts radiation waves in different discrete directions with frequency shifts that are successive multiples of the excitation frequency of the oscillator.

If an appropriate reflector 31 as shown in FIG. 4 is coupled to the earth, then all surface movements will result in a Doppler shift of the reflected sensing beam. These movements may be signal (seismic vibrations) or noise. Seismic vibrations may be superimposed on other, possibly large, and perhaps more or less constant movements (e.g., due to wind). Further, the seismic velocities to be measured must give frequency changes that are larger than other, random frequency (and amplitude) changes responsible for linewidth broadening. These random changes may be due to laser source instabilities and/or disturbances along the optical pathway (e.g., atmospheric conditions and changes). Using two "sensing" beams and two "reference" beams, i.e. polarized, allows for minimizing the effects of such random changes. Reasonably coherent radiation, such as from a laser, is preferably used. The reflected and detected radiation will include FM from seismic movements, as well as FM and/or AM as a result of these noises and disturbances.

However, for such an airborne system, a person or animal may look upward and receive direct laser radiation in the eye. Any such direct exposure to laser radiation should not cause any eye damage. Thus, eye safety is important for most applications of the methods and apparatus of the present invention because the ground's surface will be illuminated from an airborne platform.

Acceptably safe laser power levels are highly dependent on the wavelength of the laser. The lens of the eye focuses visible light, 400–760 nm, onto the retina, causing a large increase of intensity. This increase in intensity, especially for a visible light laser, can result in thermal damage of the retina. Near ultraviolet radiation, 310–400 nm, is known to cause photochemical damage. Near infrared radiation, 760–1400 nm, is also focused and has the additional problem of being invisible. Infrared radiation >1400 nm is not focused by the eye; indeed it is absorbed at the lens of the eye and is considered relatively safe.

Maximum permissible eye exposure levels used herein are based on levels cited in a textbook. (See, for example "Laser Remote Sensing, Fundamental Applications", by R. M. Measures, John Wiley & Sons, New York, 1984; p. 203). These specifications, in units of energy per square cm, are not appropriate for CW laser operation. A maximum intensity specification (watts/cm$^2$) has been calculated using this maximum exposure level for a time of ten seconds (worst case). For visible and near infrared radiation, 1 milliwatt/cm$^2$ is deemed as marginally safe, while for infrared the maximum tolerable level is two orders of magnitude greater, 100 milliwatts/cm$^2$. A reasonable specification for any system is to always have illuminating radiation levels below the values noted above but not higher than necessary for adequate detection.

For remote detection, the laser beam is initially preferably split into sensing SEN and reference REF beams, as depicted in FIG. 3. Further, as noted in FIG. 3, the reflected sensing beam 21 carries both an earth motion signal 13 (of one polarization) and an inertial signal 13' (of another polarization). Also, there are two frequency preshifted reference beams, each having the same polarization as one of the sensing beams 13, 13', for creating a "seismic" 14 and an "inertial" 14' reference signal. These two sets of polarized sensing and reference signals may then be combined in beam combiners 22, 22'.

In general, when electromagnetic radiation is reflected from a moving object, it experiences an angular velocity ($2\pi f$) shift equal to the dot product of the velocity vector of the movement and the difference vector between the wave vectors of the transmitted and reflected radiation; the wave vectors lie in the beam propagation direction and have a magnitude of $2\pi/\lambda$. Thus, the field of the reflected radiation is FM (frequency modulated) by the action of the surface movements of the reflecting target area.

For both the earth coupled and inertial reflector, the respective polarization component of the sensing beam (SEN) reflects from the reflector 30 thereby undergoing a Doppler shift due to any relative motion between the airborne platform and the reflector, and may also include ground motion coupled to the reflector 31 illuminated by the transmitted beam and may be written as, $$SEN = A \cos(2\pi F_{rtn}(t) t), \quad (1)$$

with $$F_{rtn}(t) = F_{opt}(t - t_r) + F_{dop}(t) + F_{turb}(t), \quad (2)$$

and $$t_r = 2R/c, \quad (3)$$

where, $F_{opt}$ is the transmitted radiation frequency, which is represented as time varying because the laser frequency is not perfectly constant; $t_r$ represents the delay time or round-trip delay to the ground; $F_{rtn}$ is the reflected radiation's frequency; $F_{dop}$ is the Doppler shift, which is represented as time varying because the reflector's particle velocity may be continuously changing; $F_{turb}$ is the frequency modulation caused by turbulent air along the ray path; R is the distance between the laser and target on the ground; $\pi$ is 3.14159; A is the signal's amplitude; c is the speed of light; and t is time. Further, for vertical line-of-sight back-scattering the Doppler shift ($F_{dop}$) is caused by any vertical velocity of motion, $$F_{dop}(t) = 2V_d(t)F_{opt}/c. \quad (4a)$$
$$= 2V_d(t)/\lambda \quad (4b)$$

where, $V_d$ is the vertical velocity causing the Doppler shift, and c is the speed of light.

The frequency of the reference beam (REF) is preferably deliberately shifted by a fixed frequency that is larger than any expected Doppler shift resulting from seismic waves and may be written as, $$REF = B \cos(2\pi F_{ref}(t) t), \quad (5)$$

with $$F_{ref}(t) = F_{opt}(t) - F_{osc}, \quad (6)$$

where, $F_{ref}$ is the shifted reference beam frequency, $F_{osc}$ is a fixed frequency shift (preshift), and B is the signal's amplitude. Such a preshift may be, for example, 80 MHz, or any other convenient frequency sufficient to cover the expected Doppler shifts. In the present differential method, two reference beams are generated at two different preshifted frequencies $F^S_{osc}$ (for seismic) and $F_{osc}^I$ (for inertial) as shown in FIG. 3 at 14, 14'.

Both polarizations of the reflected sensing beam $F_{rtn}^I$ and $F_{rtn}^S$ are optically recombined with the appropriate reference beams by beam combiners 22 and 22' and projected onto detectors 15 and 15' respectively. The mixing process can be visualized as the formation of interference fringes resulting from alternate constructive and destructive interference between the two waves at the detector location. Vibration detection consists of the detection of changes in the interference fringe pattern due to changes in frequency. Each detector 15, 15' is a square law (quadratic) device so its output consists of various components (or terms) associated with the intensity of the sensing beam, the intensity of the reference beam and a mixed sensing/reference beam intensity. Interferometric mixing of the reflected sensing and reference beam results in a detector current in which the frequency (phase) difference between the sensing and reference beams, as well as the amplitude product of both beams, appears, along with other terms that are not of interest.

In simplistic terms, the detector current is proportional to the instantaneous intensity, I, which is given by, $$I = SEN^2 + REF^2 + 2 SEN \cdot REF + Noise \quad (7)$$

where, $SEN^2$ is the separate modulated intensity of the sensing beam and $REF^2$ is the separate modulated intensity of the reference beam. The 2 SEN·REF term is proportional to $$2\epsilon AB \cos[(F_{osc} + F_{opt}(t) - F_{opt}(t - t_r) + F_{dop}(t) + F_{turb}(t)) t] \quad (8)$$

where, $\epsilon$ is an efficiency coefficient, $F_{osc}$ is the frequency preshift which moves this term away from the modulated near DC terms of $SEN^2$ and $REF^2$, and the other terms represent desired and unwanted frequency modulation as described above. The strength of the interferometric term (the cos term) depends upon the individual beam intensities and the efficiency factor ($\epsilon$), which is in turn dependent upon polarization matching and beam overlap between the reflected sensing and reference beams.

In general, the detector 15, 15' should be sensitive to the wavelength of the radiation employed, produce a low noise level, and have a sufficiently short response time to enable it to follow the signal changes. Solid state arrays may be employed to detect multiple beams from multiple spots. Further, such arrays may be the front end of an electronic package containing appropriate detector electronics on a chip behind the array.

The interferometric term's strength may be increased (except as limited by shot noise in the detector) by increasing the intensity of the reference beam; in general the sensing beam intensity is set by eye damage considerations and the reflected intensity will be lower. A filter 16, 16' following the detectors 15, 15' may be used to select only the difference frequency or interferometric component which is centered at $F_{osc}$. Also present in the output of the detector and/or filter are noise terms; such terms are $N_{sht}$, representing receiver shot noise and $N_{bck}$, representing interfering signals such as sunlight. Shot noise in the detector is due to the discrete charge of electrons, generated either spontaneously (dark current, dark noise) or under the influence of incident radiation (either laser or background).

The output of the filter ($FILT_{out}$) 17, 17' may be written as, $$FILT_{out} = C\cos(2\pi F_{out}(t)t) + N_{sht} + N_{bck}, \quad (9)$$
with
$$F_{out}(t) = F_{rtn}(t) - F_{ref}(t) \quad (10)$$
$$= F_{osc} + F_{dop}(t) + F_{opt}(t - t_r) - F_{opt}(t). \quad (10')$$

The discussion above relates to both the seismically coupled and the inertial beam polarization components shown in FIG. 3. The term $F_{dop}$ and the term $F_{osc}$ are different for these two polarization components. The two cases are now distinguished by an "S" superscript for seismically coupled and an "I" superscript for inertial signals, and may be written as, $$F^S_{out} = F^S_{osc} + F_{earth} + F_{source} + F_{turb} + F_{opt}(t-tr) - F_{opt}(t) \qquad (11)$$

$$F^I_{out} = F^I_{osc} + F_{source} + F_{turb} + F_{opt}(t-tr) - F_{opt}(t) \qquad (12)$$

where $F_{source}$ is the source platform Doppler.

As shown in FIG. 3, the two signals $FILT^S_{out}$ 17 and $FILT^I_{out}$ 17' are beat together in mixer 18 and filtered by filter 19 to recover the signal BEAT which is at the difference frequency, $F^S_{out} - F^I_{out}$, that is, $$BEAT = D \cos(2\pi F_{beat} t) + N_{comb} \qquad (13)$$

with $$F_{beat} = F^S_{osc} - F^I_{osc} + F_{earth} \qquad (14)$$

The noise term $N_{comb}$ contains the combined contributions of both shot and background noise. Note well that the laser instability noise $F_{opt}(t-tr) - F_{opt}(t)$ is eliminated as well as the source platform Doppler $F_{source}$ and any frequency shift caused by turbulence, $F_{turb}$.

The signal BEAT is the "carrier" of the seismic information. This carrier is frequency modulated by the Doppler/seismic signal $F_{earth}$ which is to be recovered by demodulator 20. It is an important requirement for any receiver that a strong carrier-to-noise ratio (CNR) be established. Laser power levels large enough such that the reflected sensing beam can overcome the shot and background noise are believed to be achievable. Accordingly, the noise terms, $N_{sht}$, $N_{bck}$, and $N_{comb}$ will be ignored.

Given adequate CNR, the discriminator module 20, shown in FIG. 3, will successfully recover the frequency signal $F_{earth}$.

The signal $F_{earth}$ is carried as a frequency modulation (FM) or phase modulation of the beat term of the detected signal. The means for processing this beat signal may be by phase demodulation or frequency demodulation techniques. Presently preferred is FM-demodulation using standard equipment such as FM Demodulator 20. FM demodulation must change this frequency modulation into a velocity signal. Phase-locked loop (PLL) demodulators may be used for such demodulation. The PLL must be designed for the expected range of seismic Doppler signals and must be linear in this range.

Laboratory experiments with a calibrated shaker table have shown that velocities as low as 2.3 microns/sec can be detected above the laser frequency instability noise of an Argon ion laser (operating at 514.5 nanometers), equipped with etalons for linewidth reduction. This was achieved with a path length difference (2-way range) of 162 m. The laser frequency instability noise observed was strongest at frequencies above the seismic band. These experiments may have been contaminated by building vibration so the actual laser frequency instability noise may even be lower than observed. As noted before, equalizing the path lengths of the reference and sensing beams is one way to reduce the laser frequency instability noise. These experiments also demonstrated that the low frequency sensitivity (0-100 Hz) of a laser sensing device was superior to that of a geophone.

In summary, the airborne laser system described herein is intended to remotely sense seismic ground motion. Motion of the ground's surface coupled to a reflector causes a continuously shifting frequency (Doppler) of the reflected sensing beam. The Doppler frequency is proportional to the particle velocity of the ground. Mixing of sensing and reference beams, a process known as heterodyning, generates an intermediate frequency signal or "carrier" that is frequency modulated by the seismic motion. However, obtaining an adequate CNR is a prerequisite to recovering the frequency modulated seismic data.

In choosing the receiver bandwidth, BW, the Doppler frequency modulation for unwanted motions, as well as seismically induced motions should be considered. Values of 400 Khz for visible light and 20 Khz for infrared are compatible choices because a given target velocity causes a Doppler shift twenty times greater at visible light wavelengths than at infrared wavelengths. These bandwidth choices will accommodate a ground velocity of 10 cm/sec, a value sufficient for most seismic particle velocities, but perhaps not for any unwanted platform motion. Large unwanted platform motions may have to be removed by a frequency tracking loop that senses and removes the Doppler shifts of such unwanted motions.

The relative strength of the laser and any background radiation is considered next. For a visible light laser system, reflected solar radiation is the largest interference, while for infrared radiation the earth acts as the principle source of competing radiation. One way to assess the relative strength of the laser and solar background radiation is to calculate the ratio of light intensities on the reflector. The strength of the background radiation ($I_{bck}$) must be calculated in the frequency band, or equivalently the sensitive linewidth, of the receiver, $$I_{bck} = H_{bck} W_{del} \qquad (15)$$

where, $H_{bck}$ is the background irradiance spectrum, where a value of 0.15 watts/cm²-micron represents solar radiation in the visible band, and $W_{del}$ is the linewidth of the receiver, in microns.

The effective linewidth is related to the receiver's bandwidth, as follows, $$W_{del} = BW \lambda^2 / c \qquad (16)$$

A receiver bandwidth of 400 Khz converts to a linewidth of only $0.34 \times 10^{-9}$ microns so the effective solar intensity is a minuscule $5 \times 10^{-11}$ watts/cm². Similar calculations for the infrared case also indicate that background radiation is not a problem.

Using retroreflectors provides a strong return signal so laser power requirements are not prohibitive. Such a retroreflector 30 as shown in FIG. 4 may be a corner cube reflector to avoid mirror alignment problems. The use of reflective surfaces 31 appropriately coupled to the surface of the earth for detection of earth motions are also contemplated and considered part of the present invention. Similarly, "inertial" reflective surfaces 31' (i.e., vibrationally isolated from any earth motions) are also located at the surface of the earth and employed by the apparatus and methods of the present invention. Appropriately polarized lenses 32 and 32' ensure that only properly polarized light reaches respective retroreflectors 31 and 31' and, after reflection thereby, is received and processed by the optical system of FIG. 3.

Figure 6:
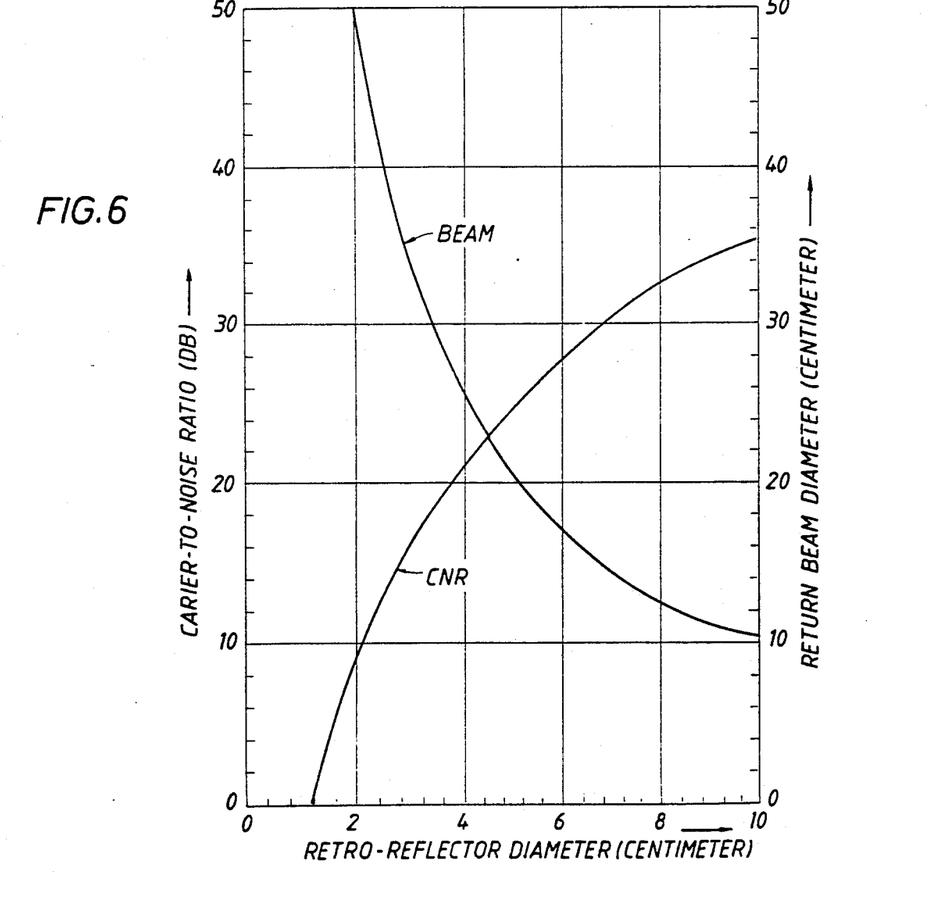
FIG. 6 is a Carrier-to-Noise (CNR) calculation.

FIG. 6 is the result of a calculation of the CNR attainable for detection of one reflector's signal (varying reflector diameter) for the case of a 10 mw infrared (10.6μ) laser. In this example a large ground spot, of 5 meters diameter, was used to make the targeting of the reflector easier. A smaller spot will cause more stringent pointing requirements but will require less laser power because less energy is wasted. The solid line curve in FIG. 6 is the CNR for various retroreflector diameters when the range between laser and reflector is 1000 m.

The ground intensity for this example is far less than the eye safe standard of 100 mw/cm$^2$, i.e. it is very safe. From FIG. 6, it is seen that a retroreflector diameter of 4 cm is adequate to obtain a 20 dB CNR for a 10 mw laser. To simultaneously illuminate 10,000 retroreflectors requires 100 watts, a large but feasible laser.

Also shown in FIG. 6 is the dashed curve which gives the diameter of the reflected beam back at the laser sensor vs. retroreflector diameter. This return beam diameter sets an upper limit on the size of the receiver lens. In general, the larger the retroreflector, the less spreading of the return beam.

The laser output is determined by the foregoing calculations and the quality of the optics used for the system of the present invention.

A variable beam splitter may be used to split the laser beam into a reference beam and a sensing beam, with a variable intensity ratio. The reference beam may be passed through an optical delay line and then preshifted in frequency by a Bragg cell (or any other appropriate opto-acoustic coupler), or the delay line and Bragg cell sequence may be reversed. To suppress unwanted stray light in the Bragg cell, the reference beam may be spatially filtered (i.e., focused by appropriate optics and sent through a small aperture). Appropriate mirrors and optics (a lens or combinations of lenses) may be employed to adjust beam direction, divergence, and/or diameter of either the reference or sensing beam, or both. A polarizer may be employed to ensure that only the appropriate polarization of the reference beam is transmitted to a beam generating device. The beam generating device converts a single beam into a plurality of beams corresponding to the plurality of sensing beams to be generated, as noted later herein. Alternatively, the reference beam may be adjusted to a large enough diameter to effectively provide the requisite number of reference beams at the beam recombining device if a single detector surface is masked at non-detector locations between recombining positions, or an array of detectors is employed. Appropriate optics cause the reference beams to be imaged onto a beam recombining device, where they recombine with appropriate sensing beams and then the interferences of the mixed beams are detected by appropriate detectors.

The sensing beam may be optionally preshifted in frequency by a Bragg cell and the polarization made circular in the preferred embodiment. The sensing beam then passes to a beam generating device which converts the single beam into a plurality of beams, which via a beam control and steering device are directed at appropriate detector locations. The reflected radiation beams form the signal beams.

As presently preferred in the methods and apparatus of the present invention, a nearly parallel outgoing sensing beam and reflected sensing beam configuration are employed, i.e., one set of optics is used to send the sensing beam to the target and a second set of optics is used to receive the reflected sensing beam.

At a beam recombining device, such as a combining beam-splitter, the beams (signal and reference) are brought to coincidence and combined and then projected onto an appropriate detector, where the actual interferometric mixing occurs. The detector's output is amplified and filtered and passed onto electronic circuitry which forms the difference frequency signal and then demodulates that signal. The demodulated signal may then be low-pass filtered to isolate the signal of interest from unwanted signals and/or noise.

The demodulation circuitry may be a conventional FM demodulator. The detector may be any conventional optical detector, such as a photomultiplier, photodiodes, or any other type of photodetector. For the sensing beam shown in FIG. 5, the beam generating device may be a plurality of parallel "telescopes" each directed at their respective target area of the earth (via an appropriate beam steering and control device) and all simultaneously illuminated by an optically enlarged sensing beam from a laser; any other type of device for generating multiple beams from a single beam may be employed in the present invention. One such device is a combination of multiple beam splitters in series and parallel. Alternatively, a single beam may be used to scan the retroreflectors in a time-sharing manner.

The present invention eliminates any unwanted Doppler associated with vibrations of the laser platform of the airborne system. This occurs because one polarization component of the beam reflects off a reflective inertial element. A simple example of such a reflective inertial element would be a retroreflector mounted on the non-moving (inertial) part of a geophone as shown in FIG. 4.

However, as noted hereinbefore, having the inertial mirror on the ground also has other advantages. More particularly, if both beams are close together or coaxial, they will experience the same turbulence, and have a common phase disturbance (a deleterious effect) which is removed by forming the difference frequency using heterodyning techniques. Further, the raypath lengths of both beams are nearly the same which reduces or eliminates the effect (if any) of laser frequency instability or other delay dependent noises, which were discussed earlier herein.

Many other variations and modifications may be made in the apparatus and techniques hereinbefore described, by those having experience in this technology, without departing from the concepts of the present invention. Accordingly, it should be clearly understood that the apparatus and methods depicted in the accompanying drawings and referenced in the foregoing description are illustrative only and are not intended as limitations on the scope of the invention.

What is claimed is:

1. A method for remotely measuring seismic signals at the surface of the earth, comprising the steps of:
   producing a laser beam of substantially monochromatic frequency;
   splitting said laser beam into a sensing beam and a reference beam;
   splitting said reference beam into first and second polarized reference beams;
   changing the frequency of said first polarized reference beam to produce a first predetermined frequency offset between the frequency of its respective sensing beam and the frequency of said reference beam;

changing the frequency of said second polarized reference beam to produce a second predetermined frequency offset between the frequency of its respective sensing beam and the frequency of said reference beam;

directing said sensing beam to a preselected location on the earth's surface;

detecting said sensing beam and reflecting it in two polarized beams;

separating said reflected sensing beam into two polarized reflected sensing beams;

intercepting and combining each pair of similarly polarized reflected sensing and reference beams;

imaging said combined beams onto first and second detection planes;

producing, at a first and second frequency equal to said first and second predetermined frequency offsets, first and second individual beat signals varying in accordance with variations in the interference resulting from individually combining said respective sensing and reference beams;

processing each individual beat signal to generate a composite beat signal which is centered at a frequency that is the difference between said first and second offset frequencies and which signal is also frequency modulated by the Doppler shifts associated with earth vibrations; and measuring variations in phase or amplitude of said composite beat signal to determine seismic signals therefrom.

2. Apparatus for remotely measuring seismic signals at the surface of the earth, comprising:

a laser for producing a laser beam of substantially monochromatic frequency;

a beam splitter for splitting said laser beam into a sensing beam and a reference beam;

a polarizing beam splitter for splitting said reference beam into first and second polarized reference beams;

a first optical modulator for changing the frequency of said first polarized reference beam to produce a first predetermined frequency offset between the frequency of its respective sensing beam and the frequency of said reference beam;

a second optical modulator for changing the frequency of said second polarized reference beam to produce a second predetermined frequency offset between the frequency of its respective sensing beam and the frequency of the reference beam;

beam generating means for generating a preselected number of parallel sensing beams;

beam control and steering means for individually directing each of said parallel sensing beams to a preselected location on the earth's surface;

means located at said preselected location for detecting and reflecting each of said sensing beams into two polarized beams;

a polarizing beam splitter for separating each of said reflected sensing beams into two polarized reflected sensing beams;

first and second beam combining means located to intercept each pair of polarized reflected sensing and reference beams and to individually combine similarly polarized sensing and reference beams;

first and second imaging means for imaging said combined beams onto first and second detection planes;

first and second detecting means located at said first and second detection planes for producing respectively, at a first and second frequency equal to said first and second predetermined frequency offsets, first and second individual beat signals varying in accordance with variations in the interference resulting from individually combining respective sensing and reference beams;

means electrically connected to said first and second detecting means for processing each individual beat signal to generate a composite beat signal which is centered at a frequency that is the difference between said first and second offset frequencies and which signal is also frequency modulated by the Doppler shifts associated with earth vibrations; and means for measuring variations in phase or amplitude of said composite beat signal and determining seismic signals therefrom.

3. Apparatus for remotely measuring seismic signals at the surface of the earth, comprising:

a laser for producing a laser beam of substantially monochromatic frequency;

a beam splitter for splitting said laser beam into a sensing beam and a reference beam;

a polarizing beam splitter for splitting said reference beam into first and second polarized reference beams;

a first optical modulator for changing the frequency of said first polarized reference beam to produce a first predetermined frequency offset between the frequency of its respective sensing beam and the frequency of said reference beam;

a second optical modulator for changing the frequency of said second polarized reference beam to produce a second predetermined frequency offset between the frequency of its respective sensing beam and the frequency of said reference beam;

means for directing said sensing beam to a preselected location on the earth's surface;

means located at said preselected location for detecting and reflecting said sensing beam into two polarized beams;

means for separating said reflected sensing beams into two polarized reflected sensing beams;

first and second beam combining means located so as to intercept each pair of polarized reflected sensing and frequency shifted reference beams and to individually combine said polarized sensing and frequency shifted reference beams having the same polarization;

first and second imaging means for imaging said combined beams onto first and second detection planes;

first and second detecting means located at said first and second detection planes for producing, at a first and second frequency equal to said first and second predetermined frequency offsets, first and second individual beat signals varying in accordance with variations in the interference resulting from individually combining said respective sensing and frequency shifted beams;

means electrically connected to said first and second detecting means for processing each individual beat signal to generate a composite beat signal which is centered at a frequency that is the difference between said first and second offset frequencies and which signal is also frequency modulated by the Doppler shifts associated with earth vibrations; and means for measuring variations in phase or amplitude of said composite beat signal and determining seismic signals therefrom.

* * * * *